(12) United States Patent
Michalski et al.

(10) Patent No.: US 11,064,692 B2
(45) Date of Patent: Jul. 20, 2021

(54) BAIT BOX FOR SEPARATING A FEEDING LOCATION BAIT BOX FOR SEPARATING A FEEDING LOCATION

(71) Applicants: Sylvia Michalski, Gross-Gerau (DE); Bjorn Saemann, Ruesselsheim (DE); Axel Spering, Aachen (DE)

(72) Inventors: Sylvia Michalski, Gross-Gerau (DE); Bjorn Saemann, Ruesselsheim (DE); Axel Spering, Aachen (DE)

(*) Notice: Subject to any disclaimer, the term of this patent is extended or adjusted under 35 U.S.C. 154(b) by 323 days.

(21) Appl. No.: 15/490,119

(22) Filed: Apr. 18, 2017

(65) Prior Publication Data
US 2017/0295773 A1 Oct. 19, 2017

(30) Foreign Application Priority Data
Apr. 19, 2016 (DE) .......................... 102016107226.5

(51) Int. Cl.
*A01M 25/00* (2006.01)
*A01M 31/00* (2006.01)

(52) U.S. Cl.
CPC ......... *A01M 25/004* (2013.01); *A01M 31/002* (2013.01)

(58) Field of Classification Search
CPC ... A01M 25/00; A01M 25/002; A01M 25/004
USPC .............. 43/131; 405/8, 9, 192; 285/133.11; 114/335
See application file for complete search history.

(56) References Cited

U.S. PATENT DOCUMENTS

| | | | | |
|---|---|---|---|---|
| 623,660 A | * | 4/1899 | Goldsborough | E02D 23/06 405/9 |
| 962,612 A | * | 6/1910 | Batten | E02D 23/02 405/8 |
| 986,970 A | * | 3/1911 | Flaherty | E02D 23/06 405/9 |
| 1,260,959 A | * | 3/1918 | Boscavilla | B63C 11/38 405/192 |

(Continued)

FOREIGN PATENT DOCUMENTS

| DE | 481043 C | * | 8/1929 | ............ A01M 25/00 |
|---|---|---|---|---|
| DE | 928497 B | | 6/1955 | |

(Continued)

OTHER PUBLICATIONS

Translation of DE 3921867 (Year: 1991).*
Translation of DE 928497 (Year: 1955).*

*Primary Examiner* — Darren W Ark
(74) *Attorney, Agent, or Firm* — Von Rohrscheidt Patents

(57) ABSTRACT

A bait box including a housing; a feeding location arranged in the housing and configured for a poison bait, wherein the feeding location is arranged in an air cushion in the housing so that the feeding location is accessible for a rodent from an outside of the bait box through an entry arranged at a lower end of the housing; and a separation element which defines a liquid space with a liquid within the housing when the liquid rises outside of the housing above a threshold level above which accessibility of the feeding location is not provided to the rodent any more, wherein the liquid space extends from the threshold level to the separation element and separates the feeding location from the liquid space, wherein the housing is closed air tight besides the entry so that the air cushion is captured in the housing.

13 Claims, 3 Drawing Sheets

(56) References Cited

U.S. PATENT DOCUMENTS

| | | | | |
|---|---|---|---|---|
| 1,619,642 A * | 3/1927 | Ward | E02D 27/24 | 405/192 |
| 1,654,832 A * | 1/1928 | Pohl | E03D 11/10 | 43/131 |
| 1,847,996 A * | 3/1932 | Belloni | B63G 8/40 | 114/335 |
| 1,866,438 A * | 7/1932 | Williamson | B63C 11/38 | 405/194 |
| 2,519,453 A * | 8/1950 | Goodman | B63C 11/44 | 405/192 |
| 2,856,724 A * | 10/1958 | Bodenbach | A01M 29/12 | 43/131 |
| 3,124,277 A * | 3/1964 | Helland | A01M 25/002 | 43/131 |
| 3,393,408 A * | 7/1968 | Martin | E03D 11/00 | 43/61 |
| 3,537,668 A * | 11/1970 | Kosmo | B64G 1/12 | 244/171.9 |
| 3,543,526 A * | 12/1970 | Krasberg | B63C 11/44 | 405/193 |
| 3,800,722 A * | 4/1974 | Lepage | B63C 11/42 | 114/333 |
| 4,070,044 A * | 1/1978 | Carrow | B29C 65/68 | 156/86 |
| 4,087,980 A * | 5/1978 | Kono | B63C 11/38 | 114/257 |
| 4,400,904 A * | 8/1983 | Baker | A01M 25/004 | 119/52.4 |
| 4,630,392 A * | 12/1986 | Ferraro | A01M 25/004 | 43/131 |
| 4,642,935 A * | 2/1987 | Fierer | A01M 1/223 | 43/131 |
| 4,724,790 A * | 2/1988 | Blanc | B63C 11/44 | 114/315 |
| 4,913,590 A * | 4/1990 | Svenning | E21B 41/06 | 405/188 |
| 5,918,410 A * | 7/1999 | Knuppel | A01M 1/2005 | 43/131 |
| 6,389,738 B1 * | 5/2002 | Denny | A01M 1/2011 | 43/58 |
| 6,409,220 B1 * | 6/2002 | Wing | A61M 1/0001 | 128/912 |
| 6,631,583 B2 * | 10/2003 | Rollins | A01M 1/026 | 43/131 |
| 6,671,999 B1 * | 1/2004 | Doucette | A01M 1/2011 | 43/131 |
| 6,901,694 B1 * | 6/2005 | Neault | A01M 1/2011 | 43/131 |
| 6,910,300 B1 * | 6/2005 | Warren | A01M 25/004 | 43/131 |
| 7,316,427 B2 * | 1/2008 | Nakagawa | B29C 37/0082 | 285/133.11 |
| 8,084,259 B2 * | 12/2011 | DiLeo | B01D 35/143 | 156/306.6 |
| 8,496,471 B2 * | 7/2013 | Griffith | F16L 19/025 | 134/22.12 |
| 8,708,052 B2 * | 4/2014 | Radi | E21B 19/004 | 166/350 |
| 8,807,873 B2 * | 8/2014 | Kiest, Jr. | F16L 55/165 | 405/184.2 |
| 8,832,994 B2 * | 9/2014 | Tolley | A01M 1/026 | 43/132.1 |
| 9,010,810 B2 * | 4/2015 | Anton | F16J 15/064 | 285/342 |
| 9,258,991 B2 * | 2/2016 | Harper | A01M 25/004 | |
| 9,510,520 B2 * | 12/2016 | Gamberini | A01G 9/1407 | |
| 9,663,068 B1 * | 5/2017 | Sykora | B60R 99/00 | |
| 10,165,769 B2 * | 1/2019 | Lewis | A01M 25/004 | |
| 10,226,039 B2 * | 3/2019 | Buchstaller | A01M 25/004 | |
| 10,869,470 B2 * | 12/2020 | Bittlinger | A01M 25/004 | |
| 2002/0043018 A1 | 4/2002 | Townsend | A01M 25/004 | 43/131 |
| 2005/0097811 A1 * | 5/2005 | Scribner | A01M 1/2005 | 43/131 |
| 2005/0132637 A1 * | 6/2005 | Deakins | A01M 25/004 | 43/131 |
| 2007/0256350 A1 * | 11/2007 | Cates | A01M 1/026 | 43/132.1 |
| 2008/0086932 A1 * | 4/2008 | Cook | A01M 1/02 | 43/114 |
| 2008/0302000 A1 * | 12/2008 | Kidder | A01M 1/2005 | 43/131 |
| 2009/0025274 A1 * | 1/2009 | Lail | A01M 23/08 | 43/67 |
| 2009/0260276 A1 * | 10/2009 | Kirsch | A01M 1/023 | 43/114 |
| 2010/0282473 A1 * | 11/2010 | Zirkle | B01D 19/0047 | 166/321 |
| 2010/0325941 A1 * | 12/2010 | Bolin | A01M 1/02 | 43/131 |
| 2011/0056117 A1 * | 3/2011 | Fritzboger | A01M 27/00 | 43/73 |
| 2014/0201904 A1 * | 7/2014 | Sapara, Jr. | A01M 29/12 | 4/638 |
| 2015/0137507 A1 * | 5/2015 | Colman | G06F 16/00 | 285/93 |
| 2016/0037763 A1 * | 2/2016 | Sapara, Jr. | E03C 1/126 | 4/638 |
| 2017/0035041 A1 * | 2/2017 | Othon | A01M 23/20 | |
| 2017/0354139 A1 * | 12/2017 | Vickery | A01M 23/005 | |
| 2017/0360024 A1 * | 12/2017 | Bittlinger | A01M 25/002 | |
| 2017/0360026 A1 * | 12/2017 | Zirkle | A01M 25/004 | |
| 2018/0007889 A1 * | 1/2018 | Bittlinger | A01M 25/002 | |
| 2018/0132475 A1 * | 5/2018 | Bittlinger | A01M 1/2011 | |
| 2019/0075783 A1 * | 3/2019 | Buchstaller | A01M 25/004 | |
| 2019/0124913 A1 * | 5/2019 | Power | A01M 31/002 | |
| 2020/0315157 A1 * | 10/2020 | Buchstaller | A01M 25/004 | |

FOREIGN PATENT DOCUMENTS

| | | | | |
|---|---|---|---|---|
| DE | 928497 C * | 6/1955 | | A01M 25/00 |
| DE | 3921867 A1 * | 1/1991 | | A01M 25/002 |
| DE | 102014102034 A1 | 2/2015 | | |
| DE | 102014112804 A1 | 3/2016 | | |
| DE | 202016001724 U1 * | 5/2016 | | A01M 25/004 |
| DE | 202016002386 U1 | 3/2017 | | |
| EP | 2063705 B1 * | 11/2014 | | A01M 1/2011 |
| EP | 2950642 B1 * | 7/2018 | | A01M 23/02 |
| JP | 3146578 U * | 11/2008 | | |

* cited by examiner

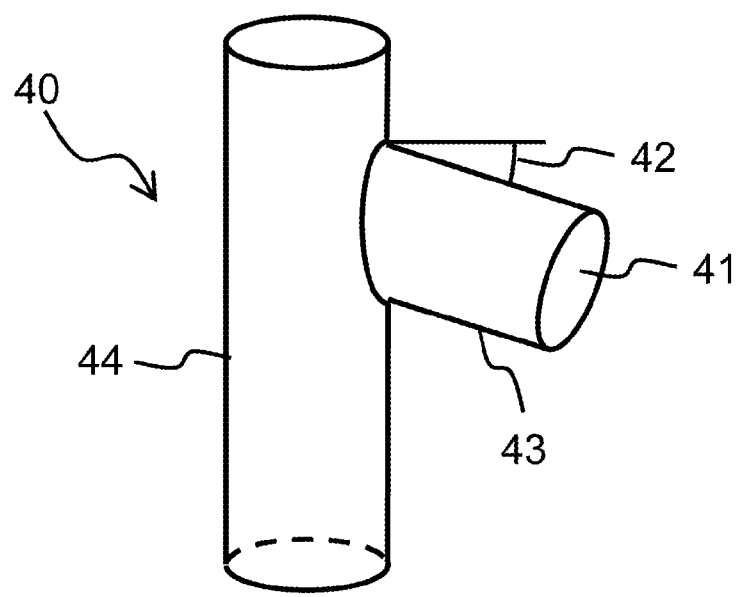
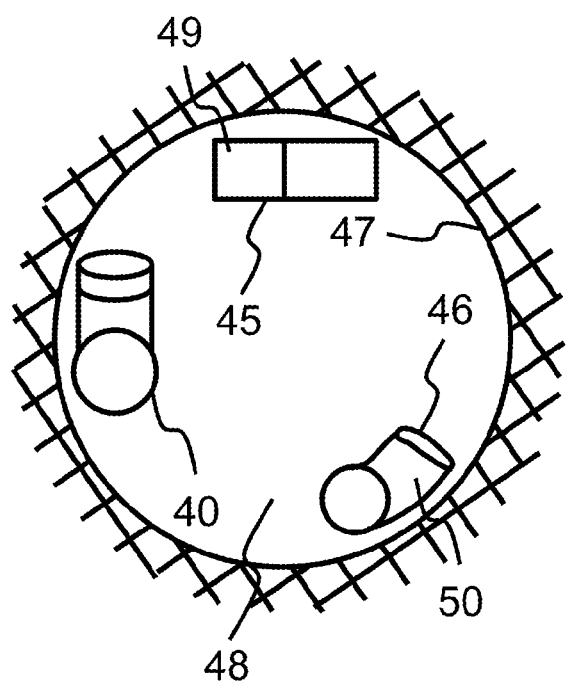
FIG. 3
Fig. 4

BAIT BOX FOR SEPARATING A FEEDING LOCATION BAIT BOX FOR SEPARATING A FEEDING LOCATION

RELATED APPLICATIONS

This application claims priority from and incorporates by reference German Patent Application DE10 2016 107 226.5 filed on Apr. 19, 2016.

FIELD OF THE INVENTION

The invention relates to bait box

BACKGROUND OF THE INVENTION

A bait box and a method of the generic type recited supra are known from DE 10 2014 102 034 A1. The known bait box includes a bell shaped housing in which an air cushion is captured and the feeding location is configured in the air cushion. The bait box includes a float that is vertically guided in the housing. A lower edge of the float is defined as the threshold level. As long as the liquid does not rise above the threshold level the float is arranged below an entry for a rat which entry leads vertically from below into the housing of the bait box. When the liquid rises the float with the feed location floats up until it contacts an edge that is circumferentially arranged around the entry. Separation elements configured as seal elements are arranged at the edge and at the float of the known bait box wherein the seal elements close the intermediary space between the edge and the float so that they separate the feeding location in the housing from a liquid space with the liquid outside of the housing. This way the known bait box prevents the poison from being flushed out of the bait box and prevents a contamination of the liquid with the poison bait.

The known bait box with the edge circumferentially extending in the housing and the float with the seal ring has a configuration which requires precise adjustment of the components to each other.

In particular liquid flowing in a sewer channel can be highly loaded with solids which also deposit in the housing of the known bait box and at the float when the liquid rises. The deposits can impede the float floating up in the housing and can also impair the sealing effect of the sealing element so that the feeding location of the known bait box is submerged and the poison bait gets into the liquid. The known bait box therefore has to be frequently checked for deposits and replaced or cleaned in a complex manner when required.

DE 20 2016 002 386 U1 discloses a bait box with a detector, DE10 2014 112 804 A1 discloses a bait box with a feeding location on a float and DE 928 497 B discloses a bait box with a wall holder

BRIEF SUMMARY OF THE INVENTION

Thus, it is an object of the invention to simplify the configuration of the bait box and the method for separating the feed location from rising liquid.

The object is achieved according to the invention by improving upon the known bait box so that the separation element is the air cushion. The invention is based on the fining that the captured air cushion already prevents a rise of the liquid beyond a bottom side of the air cushion. The bait box according to the invention avoids moving parts and seal elements that are required in the prior art.

The object is achieved by a bait box including a housing; a feeding location arranged in the housing and configured for a poison bait, wherein the feeding location is arranged in an air cushion in the housing so that the feeding location is accessible for a rodent from an outside of the bait box through an entry arranged at a lower end of the housing; and a separation element which defines a liquid space with a liquid within the housing when the liquid rises outside of the housing above a threshold level above which accessibility of the feeding location is not provided to the rodent any more, wherein the liquid space extends from the threshold level to the separation element and separates the feeding location from the liquid space, wherein the housing is closed air tight besides the entry so that the air cushion is captured in the housing when the liquid arises in the housing, and wherein the separation element is the air cushion.

The object is achieved by a method for separating a feeding location in a housing of a bait box for a poison bait, wherein the feeding location is arranged in an air cushion in the housing so that the feeding location is accessible for a rodent from an outside of the bait box through an entry arranged at a lower end of the housing; and a separation element which defines a liquid space with a liquid within the housing when the liquid rises outside of the housing above a threshold level above which accessibility of the feeding location is not provided to the rodent any more, wherein the liquid space extends from the threshold level to the separation element and separates the feeding location from the liquid space, wherein the housing is closed air tight besides the entry so that the air cushion is captured in the housing when the liquid arises in the housing, the method comprising the step: configuring the separation element as the air cushion.

Advantageously a bait box according to the invention includes a tubular housing that is closed at a top end and includes an entry for the rodent at a bottom end. The housing can be made for example from a commercially available ground sewer pipe made from hard PVC that is closed by a blind cover on top.

Advantageously the entry leads into the housing in a radial direction. An entry of this type can be easily milled or sawed into a ground sewer pipe in the radial direction. The radial entry prevents a blockage by arranging the housing too tight above a base of the sewer or above an obstacle. Alternatively in a simpler embodiment of the bait box the axial opening at a lower end of the tubular housing can form the entry.

Advantageously the air cushion envelopes the feeding location. When it is assured that the feeding location is completely enveloped by the air cushion at any time any additional securing against flushing the poison bait out with the liquid becomes redundant. Alternatively the feeding location can be for example floated up into the air cushion by the rising liquid.

Advantageously a chamber in which the feeding location is configured is radially attached to the housing. A chamber of this type can be configured for example by a radial branch off from the ground sewer pipe. In the chamber the rodent can eat the poison bait easily. Alternatively the poison bait can be arranged at an upper end of the housing in a simpler embodiment of the bait box.

Further advantageously a base of the chamber drops in outward direction starting from the housing. The dropping base prevents an unintentional fall out of the loose portions of the poison bait from the chamber and from the housing. Alternatively a chamber with non-dropping base can for example include a threshold in a transition to the housing.

Advantageously a replaceable cover with the poison bait is arranged at the bait box. The replaceable cover with the poison bait facilitates on the one hand side adaptation of the poison bait to different legal conditions, climate conditions and different rodents.

Alternatively a float is vertically guided in the housing and the feeding location is configured on the float. A float of this type always sits on top of the liquid as long as it is not prevented from floating up by installations or deposits in the housing. The feed location is thus effectively protected against being submerged by the liquid.

Advantageously an identification element for identifying the bait box is readable touch free. An identification element of this type facilitates quickly controlling an identity of the bait box.

Advantageously the bait box is supportable by a support at a wall of a sewer element. Thus, a position of the bait box in the sewer element can be easily predetermined.

Improving upon the known method it is proposed according to the invention that the divider element is an air cushion that is captured in the bait box. The method according to the invention is performed with a bait box according to the invention and is characterized by the advantages described supra.

Advantageously the air cushion is compressed by the rising liquid. Also the compressed air cushion prevents a rise of the liquid beyond its bottom side.

BRIEF DESCRIPTION OF THE DRAWINGS

The invention is subsequently described based on an embodiment with reference to drawing figures, wherein:

FIG. 3 illustrates a third bait box according to the invention; and

FIG. 4 illustrates the first bait box and two additional bait boxes according to the invention in a top view in a sewer element.

DETAILED DESCRIPTION OF THE INVENTION

Figure 1:
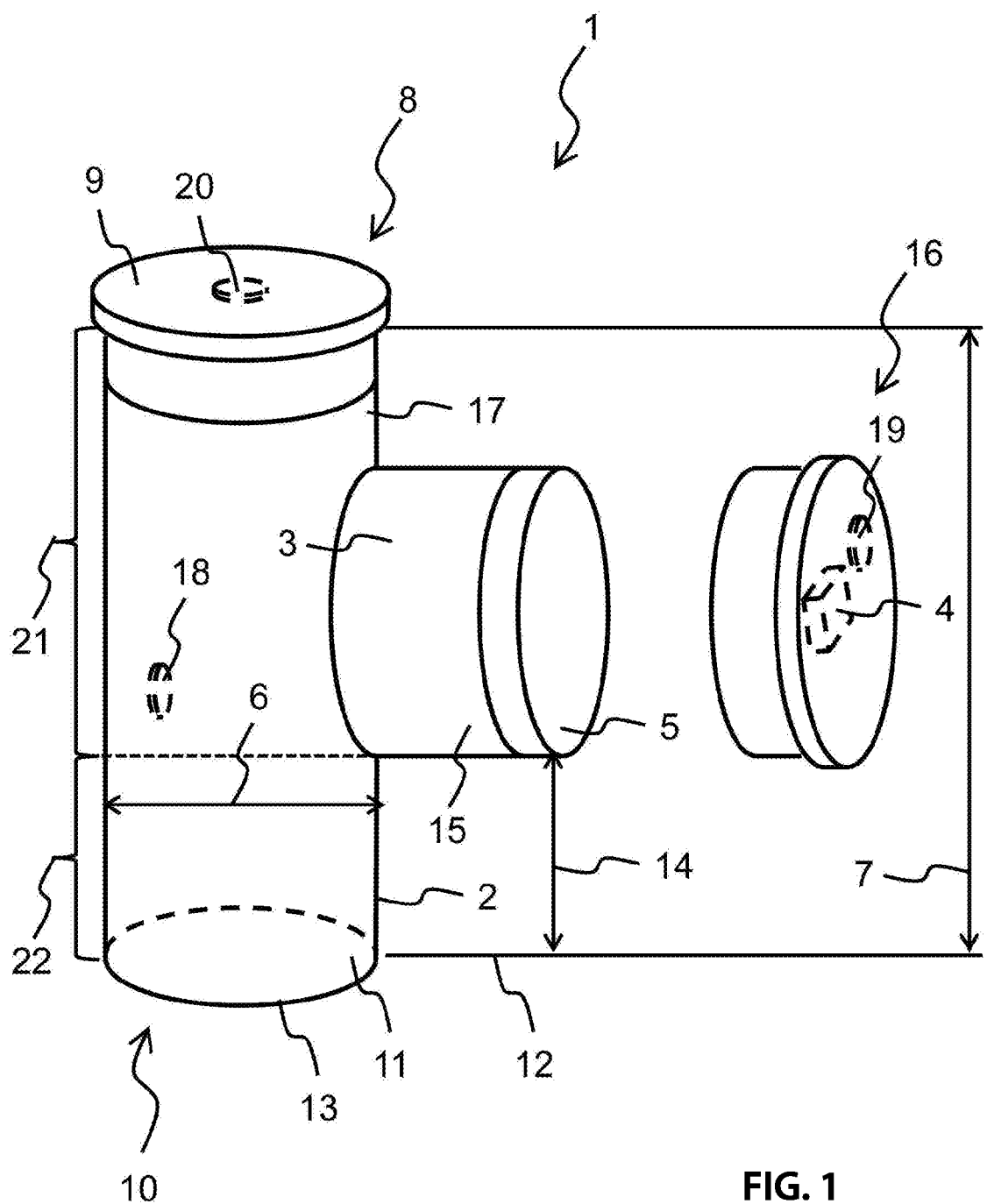
FIG. 1 illustrates a first bait box according to the invention.

The first bait box 1 according to the invention illustrated in FIG. 1 includes a tubular housing 2 with a chamber 3 in which a poison bait 4 is arranged and a feeding location 5 for a rat that is not illustrated.

The housing 2 is made from a sewer ground tube DN100 and has a diameter of 6-10 cm and a height of 7-25 cm. The housing 2 is closed air tight at an upper end 8 by a cover 9 that is screwed on and includes an entry 11 for the rat at an open lower end 10. The threshold level 12, thus the highest liquid level at the bait box 1 at which liquid level access for the rodent is provided without any obstacles is arranged at a level of the lower edge 13 of the housing 2.

The chamber 3 is configured at a distance of 10 to 14 cm above the lower edge 13 in a radial branch 15 of the housing 2 also configured with DN100 and closed air tight by a second cover 16 that is screwed on. The poison bait 4 is glued onto an inside of the cover 16.

A first identification element 18 is enclosed in a wall 17 of the housing 2 and a second identification element 19 is enclosed in the second cover 16 wherein the identification elements are RFID chips with a permanent unique identifier. In the first cover 9 at an upper end 8 of the housing 2 a documentation device 20 with a passive infra-red sensor is integrated for presence determination.

The infra-red sensor detects a rodent entering the bait box 1 based on body heat of the rodent. When the rodent remains in the bait box 1 for at least one minute feeding at the poison bait 4 is presumed and stored with a time stamp in a data memory of the documentation device 20.

In another non-illustrated bait box 1 according to the invention the documentation device 20 for presence determination is provided with a radio based location and distance sensor (radar).

The documentation device 20 automatically reads the identifiers of two identification elements 18, 19 when the bait box 1 is assembled and stores the identifiers in the data memory. The documentation device 20 includes a transmit and receive module for wireless communications, in particular a RFID module for local area communications and provides the data stored in the data memory upon request through the RFID module.

When the bait box 1 is configured for use in a sewer shaft absolute co-ordinates of the sewer shaft in the form of geo referenced data and also information regarding the position in text like e.g. the proximal street address, the side of the street with driving direction or geographic direction and regarding the associated sewer is stored in the associated data memory. If available the documentation device 20 also reads an identifier of the sewer shaft automatically when the bait box 1 is inserted into the sewer shaft and automatically stores the sewer shaft identifier in the data memory. When the data is read out the documentation device 20 links its own unique identifier with the captured data through a hash value, e.g. MD5.

The first cover 9, the second cover 16 are replaceable and facilitate configuring the bait box 1 according to requirements, e.g. with different poison baits and different documentation devices and sensors.

The first bait box 1 is configured for use in sewers in which it is not submerged in liquid by more than 100 cm above the threshold level. Up to this upper limit the air cushion 21 captured in the bait box 1 is only compressed enough so that it limits the rise of the liquid above the liquid cavity 22 configured between the threshold level 12 and the chamber 3. Thus, the air cushion 21 encloses the feed location 5 of the bait box 1 in any operating condition and thus effectively prevents the poison bait 4 from being flushed out.

Figure 2:
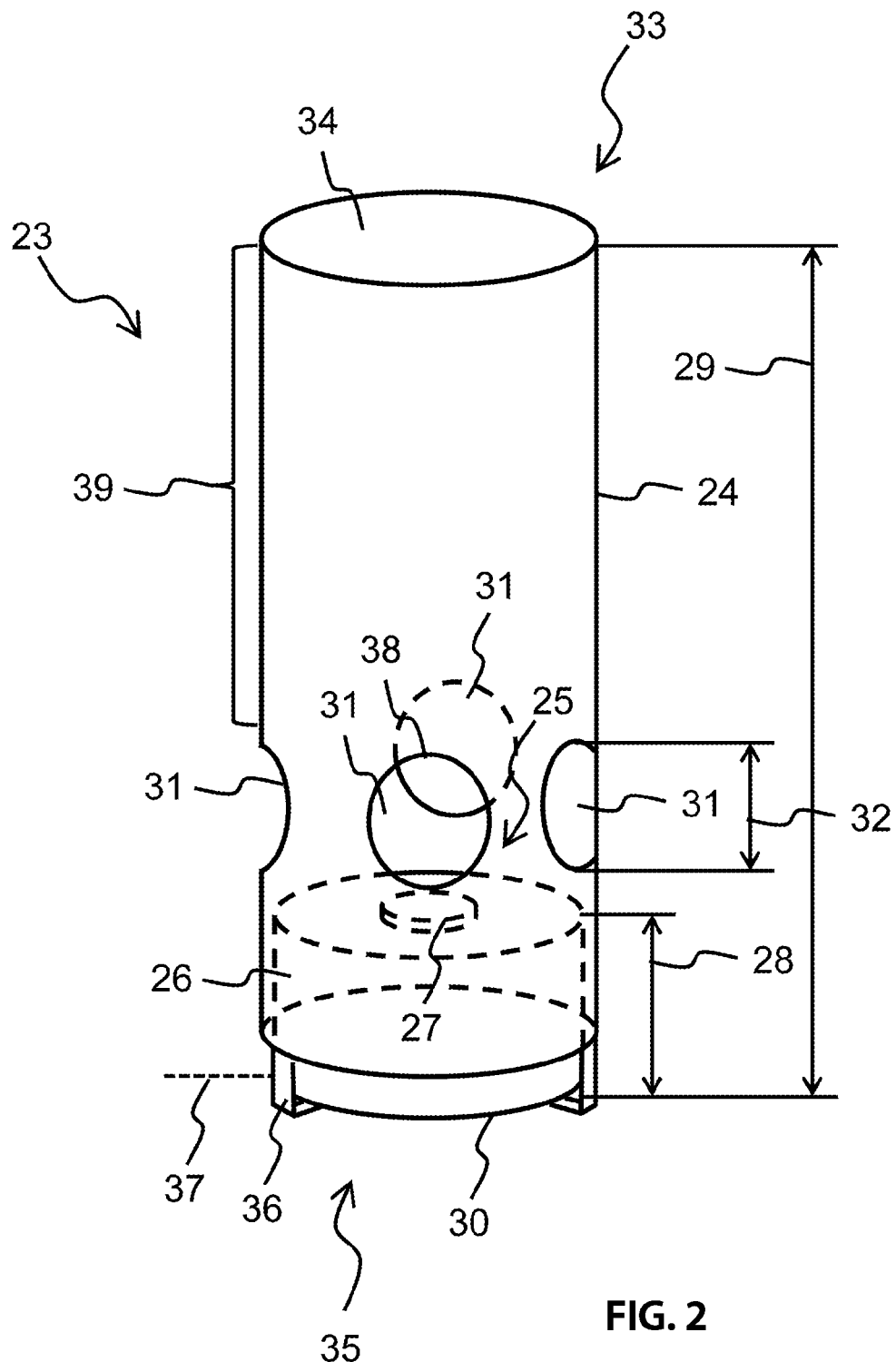
FIG. 2 illustrates a second bait box according to the invention.

FIG. 2 illustrates a second bait box 23 according to the invention which also includes a tubular housing 24, but without a chamber radially connected to the housing 24. Instead the feeding location 25 is configured on a cylindrical float 26 that is vertically supported in the housing 24. A poison bait 27 is glued onto the float 26. The float 26 is made from foamed polystyrol that is painted impact resistant and has a height 28 of 6 cm. A documentation device with a passive infra-red sensor for presence detection is integrated in the float 26 wherein the documentation device corresponds to the first bait box 1.

The housing 24 is made from a sewer ground tube DN 100 with a height 29 of 30 cm and includes four circular entries 31 8 cm above a lower edge 30 of the housing 24 for the rodent wherein the entries have a diameter 32 of 3 cm respectively. The housing is closed with a welded cover 34 at an upper end 33 and provided at a lower end 35 with a removable clamp 36 which prevents the float 26 from dropping out. The threshold level 37 is arranged below the entries 31 by the height 28 of the float 26.

When the liquid rises above the threshold level the float 26 initially floats up as soon as the liquid reaches the upper edge 38 of the entries 31 and the air cushion 39 captured there above is compressed.

The second bait box 23 is configured for use in sewers in which it is submerged by several meters without the poison bait 27 coming in contact with the liquid. In order to prevent penetration of water spray through the entries 31, for example when high pressure flushing the sewer, the entries 31 can be surrounded by a downward open collar that is not illustrated.

FIG. 3 illustrates a third bait box 40 according to the invention configured as a variant of the first bait box 1. The chamber 41 includes a base 43 that slopes downward at an angle 42 of 10° relative to horizontal in an outward direction so that also fragments of the poison bait cannot unintentionally move from the chamber into the housing 44 and from there into the liquid in the chamber.

FIG. 4 illustrates the third bait box 40 in a view from below and two additional bait boxes 45, 46 according to the invention which are fixed by a non-illustrated holder at a wall 47 of a sewer shaft 48. The fourth bait box has a rectangular tube cross section 49 and otherwise corresponds to the first bait box 1. The fifth bait box 46 essentially corresponds to the third bait box 40 but includes a profile of the chamber 50 that is slightly cambered along the wall so that a free cross section of the chamber is restricted as little as possible in narrow sewers.

REFERENCE NUMERALS AND DESIGNATIONS 1 bait box
2 housing
3 chamber
4 poison bait
5 feeding location
6 diameter
7 height
8 upper end
9 first cover
10 lower end
11 entry
12 threshold level
13 lower edge
14 distance
15 branch off
16 second cover
17 wall
18 first identification element
19 second identification element
20 documentation device
21 air cushion
22 liquid cavity
23 bait box
24 housing
25 feeding location
26 float
27 poison bait
28 height
29 height
30 lower edge
31 entry
32 diameter
33 upper end
34 cover
35 lower end
36 clamp
37 threshold level
38 upper edge
39 air cushion
40 bait box
41 chamber
42 angle
43 base
44 housing
45 bait box
46 bait box
47 wall
48 sewer shaft
49 pipe cross section
50 chamber

What is claimed is:

1. A bait box, comprising:
a vertical housing;
a poison bait;
a feeding location arranged in the vertical housing and configured for the poison bait;
wherein the feeding location is arranged in an air cushion in the vertical housing so that the feeding location is accessible for a rodent from an outside of the bait box through an entry arranged at a lower end of the vertical housing; and the air cushion defines a liquid space with a liquid within the vertical housing when the liquid rises outside of the vertical housing above a threshold level above which accessibility of the feeding location is not provided to the rodent any more,
wherein the liquid space extends from the threshold level to the air cushion which separates the feeding location from the liquid space,
wherein the vertical housing is closed air tight besides the entry so that the air cushion is captured in the vertical housing when the liquid rises in the vertical housing,
wherein the bait box is held at a wall of a sewer element,
wherein the vertical housing includes a radial branch closed air tight with a replaceable cover where the poison bait is attached to the replaceable cover,
wherein the threshold level corresponds to a lower edge at the lower end of the vertical housing,
wherein the air cushion is compressed in the vertical housing when the liquid rises outside of the housing above the threshold level,
wherein the vertical housing has an upper end and a longitudinal axis which is defined between the upper and lower ends, and
wherein the radial branch extends from the vertical housing in a radial direction with respect to the longitudinal axis of the vertical housing at a location between the upper and lower ends of the vertical housing.

2. The bait box according to claim 1, further comprising an identification element that is readable touch free for identifying at least one of the bait box and the poison bait, wherein the identification element includes an RFID chip.

3. A bait box, comprising:
a vertical housing;
a rodent poison bait;
a feeding location arranged in the vertical housing and configured for the rodent poison bait,
wherein the feeding location is arranged in an air cushion in the vertical housing so that the feeding location is accessible for a rodent from an outside of the bait box through an entry arranged at a lower end of the vertical housing; and the air cushion which defines a liquid space with a liquid within the vertical housing when the liquid rises outside of the vertical housing above a threshold level above which accessibility of the feeding location is not provided to the rodent any more, wherein the liquid space extends from the threshold level to the air cushion which separates the feeding location from the liquid space, wherein the vertical housing is closed air tight besides the entry so that the air cushion is captured in the vertical housing when the liquid rises in the vertical housing, wherein the bait box is held at a wall of a sewer element, wherein the vertical housing includes a radial branch closed air tight with a replaceable cover where the poison bait is attached to the replaceable cover, wherein the threshold level corresponds to a lower edge at the lower end of the vertical housing, wherein the air cushion is compressed in the vertical housing when the liquid rises outside of the housing above the threshold level, wherein the vertical housing has an upper end and a longitudinal axis which is defined between the upper and lower ends, and wherein the radial branch extends from the vertical housing in a radial direction with respect to the longitudinal axis of the vertical housing at a location between the upper and lower ends of the vertical housing.

4. The bait box according to claim 3, wherein the aft cushion envelops the feeding location.

5. The bait box according to claim 3, wherein the radial branch comprises a radially extending chamber that includes a base that slopes downward in an outward direction.

6. The bait box according to claim 3, further comprising:
an identification element that is readable touch free for identifying at least one of the bait box and the rodent poison bait.

7. The bait box according to claim 6, wherein the identification element includes an RFID chip.

8. The bait box according to claim 7, wherein the identification element identifies at least the bait box.

9. The bait box according to claim 7, wherein the identification element identifies at least the rodent poison bait.

10. The bait box according to claim 3, wherein the rodent poison bait is a rat poison bait.

11. A bait box, comprising:
a vertical housing;
a poison bait;
a feeding location arranged in the vertical housing and configured for the poison bait; and
an identification element that is readable touch free for identifying at least one of the bait box and the poison bait, wherein the feeding location is arranged in an air cushion in the vertical housing so that the feeding location is accessible for a rodent from an outside of the bait box through an entry arranged at a lower end of the vertical housing; and the air cushion defines a liquid space with a liquid within the vertical housing when the liquid rises outside of the vertical housing above a threshold level above which accessibility of the feeding location is not provided to the rodent any more, wherein the liquid space extends from the threshold level to the air cushion which separates the feeding location from the liquid space, wherein the vertical housing is closed air tight besides the entry so that the air cushion is captured in the vertical housing when the liquid rises in the vertical housing, wherein the identification element includes an RFID chip, wherein the bait box is held at a wall of a sewer element, wherein the vertical housing includes a radial branch closed air tight with a replaceable cover where the poison bait is attached to the replaceable cover, wherein the threshold level corresponds to a lower edge at the lower end of the vertical housing, wherein the air cushion is compressed in the vertical housing when the liquid rises outside of the housing above the threshold level, wherein the vertical housing has an upper end and a longitudinal axis which is defined between the upper and lower ends, and wherein the radial branch extends from the vertical housing in a radial direction with respect to the longitudinal axis of the vertical housing at a location between the upper and lower ends of the vertical housing.

12. The bait box according to claim 11, wherein the identification element identifies at least the bait box.

13. The bait box according to claim 11, wherein the identification element identifies at least the poison bait.

* * * * *